United States Patent
Cudak et al.

(10) Patent No.: US 9,977,631 B2
(45) Date of Patent: *May 22, 2018

(54) PARSING A MULTIDIMENSIONAL OBJECT FOR PRINTING IN VARIOUS RUNS

(71) Applicant: International Business Machines Corporation, Armonk, NY (US)

(72) Inventors: Gary D. Cudak, Wake Forest, NC (US); David G. Dean, Raleigh, NC (US); Christopher J. Hardee, Raleigh, NC (US); John P. Nuzzo, Wake Forest, NC (US); Matthew A. Trzyna, Raleigh, NC (US); John M. Weber, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 201 days.

This patent is subject to a terminal disclaimer.

(21) Appl. No.: 14/819,517

(22) Filed: Aug. 6, 2015

(65) Prior Publication Data

US 2017/0031639 A1 Feb. 2, 2017

Related U.S. Application Data

(63) Continuation of application No. 14/812,021, filed on Jul. 29, 2015, now Pat. No. 9,846,556.

(51) Int. Cl.
*G06K 15/00* (2006.01)
*G06F 3/12* (2006.01)
*B33Y 50/00* (2015.01)

(52) U.S. Cl.
CPC .............. *G06F 3/121* (2013.01); *B33Y 50/00* (2014.12); *G06F 3/126* (2013.01); *G06F 3/1234* (2013.01);

(Continued)

(58) Field of Classification Search
CPC ..................................................... G06F 3/1296

(Continued)

(56) References Cited

U.S. PATENT DOCUMENTS 8,747,097 B2    6/2014   Pettis
2012/0105903 A1*   5/2012   Pettis ........................ G06F 3/12
                                                                  358/1.14

(Continued)

OTHER PUBLICATIONS

Goehrke, "Screw Threading in 3D Printed Objects Now a Reality, Thanks to Formlabs," 3D Print.com, 3D Printer and 3D Printing News, Nov. 26, 2014, 3DPrint.com © 2015, 7 pages, http://3dprint.com/27032/metal-threading-in-3d-prints/.

(Continued)

*Primary Examiner* — David T Welch
(74) *Attorney, Agent, or Firm* — Scott S. Dobson (57) ABSTRACT

A first complexity estimate may be generated for a first portion of a multidimensional object. The first complexity estimate may be for use in estimating a complexity of the first portion of the multidimensional object. A printing capability may be determined for the multidimensional printer. The multidimensional printer may be for use in printing the multidimensional object. The printing capability may be compared with the first complexity estimate. A first failure probability estimate may be generated based on the comparing. The failure probability estimate may be for use in determining a likelihood that the multidimensional printer will print the first portion with an accuracy that exceeds an accuracy threshold.

9 Claims, 7 Drawing Sheets

(52) U.S. Cl.
CPC .......... *G06F 3/1244* (2013.01); *G06F 3/1284* (2013.01); *G06F 3/1296* (2013.01); *G06K 15/408* (2013.01)

(58) Field of Classification Search
USPC ........................................................ 358/1.14
See application file for complete search history.

(56) References Cited

U.S. PATENT DOCUMENTS

| | | | | |
|---|---|---|---|---|
| 2014/0058959 | A1* | 2/2014 | Isbjornssund | G06F 21/10 705/310 |
| 2014/0074274 | A1 | 3/2014 | Douglas et al. | |
| 2014/0198339 | A1* | 7/2014 | Kothari | G06F 3/1206 358/1.15 |
| 2014/0291886 | A1* | 10/2014 | Mark | B29C 47/025 264/163 |
| 2015/0321425 | A1* | 11/2015 | Stava | G06F 17/50 700/98 |
| 2016/0086258 | A1* | 3/2016 | Romes | B29C 67/0088 705/27.1 |
| 2016/0176117 | A1* | 6/2016 | Lee | G05B 19/4099 700/98 |
| 2016/0185043 | A1* | 6/2016 | Klappert | B29C 67/0088 264/40.1 |
| 2016/0229120 | A1* | 8/2016 | Levine | B29C 67/0085 |
| 2016/0257051 | A1* | 9/2016 | Pappas | B29C 47/862 |

OTHER PUBLICATIONS

Lawson, "Incredible 3D printer bridging ability," YouTube, Jul. 16, 2013, 3 pages, https://www.youtube.com/watch?v=_b6hFFcLh_Q.

Unknown, "EPIC 3D Printing Fail," Tumblr, 2 pages, http://epic3dprintingfail.tumblr.com/.

Unknown, "Bond, seal and beautify 3D printed parts," Finishing Processes, Stratasys, Stratasys Ltd. © 2015, 3 pages, http://www.stratasys.com/solutions/finishing-processes/bonding-and-gluing.

Cudak et al., "Parsing a Multidimensional Object for Printing in Various Runs", U.S. Appl. No. 14/812,021, filed Jul. 29, 2015.

List of IBM Patents or Patent Applications Treated as Related, dated Aug. 5, 2015, pp. 1-2.

Cudak et al., "Parsing a Multidimensional Object for Printing in Various Runs," U.S. Appl. No. 15/842,593, filed Dec. 14, 2017.

List of IBM Patents or Patent Applications Treated as Related, Signed Dec. 14, 2017, 2 pages.

* cited by examiner

PARSING A MULTIDIMENSIONAL OBJECT FOR PRINTING IN VARIOUS RUNS

BACKGROUND

This disclosure relates generally to multidimensional printers, and more specifically, to parsing a multidimensional object schematic to print the corresponding multidimensional object in various runs.

Multidimensional printing (e.g., 3-dimensional printing) is the process of making multidimensional objects that are derived from a digital file. A user may first generate or select a virtual design schematic (e.g., a Computer Aided Design (CAD)) that corresponds with the multidimensional object he or she desires to print. In preparation of printing the multidimensional object, a modeling program may parse the virtual design schematic into hundreds or thousands of horizontal layers. Consequently, when the virtual design is uploaded to the multidimensional printer, the multidimensional printer may read each of the parsed layers and accordingly print the multidimensional object layer by layer (i.e., additive manufacturing).

Various printing material mediums (i.e., filaments) and methods may be utilized for multidimensional printing. For example, the filaments may be plastic, metal, sand, biomaterials, ceramics, or other mediums. Various methods of multidimensional printing include melting or softening the filaments to produce the layers (e.g., Selective Laser Sintering (SLS), and Fused Deposition Modeling (FDM), etc.). Other methods include curing and solidifying a liquid medium into a solid multidimensional object (e.g., Stereolithography, (SLA), etc.).

SUMMARY

One or more embodiments are directed to a computer-implemented method, a system, and a computer program product. A first complexity estimate may be generated for a first portion of a multidimensional object. The first complexity estimate may be for use in estimating a complexity of the first portion of the multidimensional object. A printing capability may be determined for the multidimensional printer. The multidimensional printer may be for use in printing the multidimensional object. The printing capability may be compared with the first complexity estimate. A first failure probability estimate may be generated based on the comparing. The failure probability estimate may be for use in determining a likelihood that the multidimensional printer will print the first portion with an accuracy that exceeds an accuracy threshold.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to parsing a multidimensional object schematic to print the corresponding multidimensional object in various runs. While the present disclosure is not necessarily limited to such applications, various aspects of the disclosure may be appreciated through a discussion of various examples using this context.

Multidimensional printing can be costly in terms of filaments used to print multidimensional objects and the time it takes to print. If a single portion of a multidimensional object is printed poorly, the entire multidimensional object and time that went into production may be wasted. For example, a multidimensional printer may print a toy action figure, but poorly print the details of figure's face. The entire action figure may therefore be thrown away. Although a user may melt and reuse the poorly printed multidimensional object, there is still a loss of time and additional wear on the multidimensional printer. Accordingly, embodiments of the present disclosure are directed to reducing the costs of printing failures by intelligently parsing a multidimensional object schematic into job segments such that if a printing failure occurs at one portion of the multidimensional object, the printing failure will not compromise the other successful printing portions.

Figure 1:
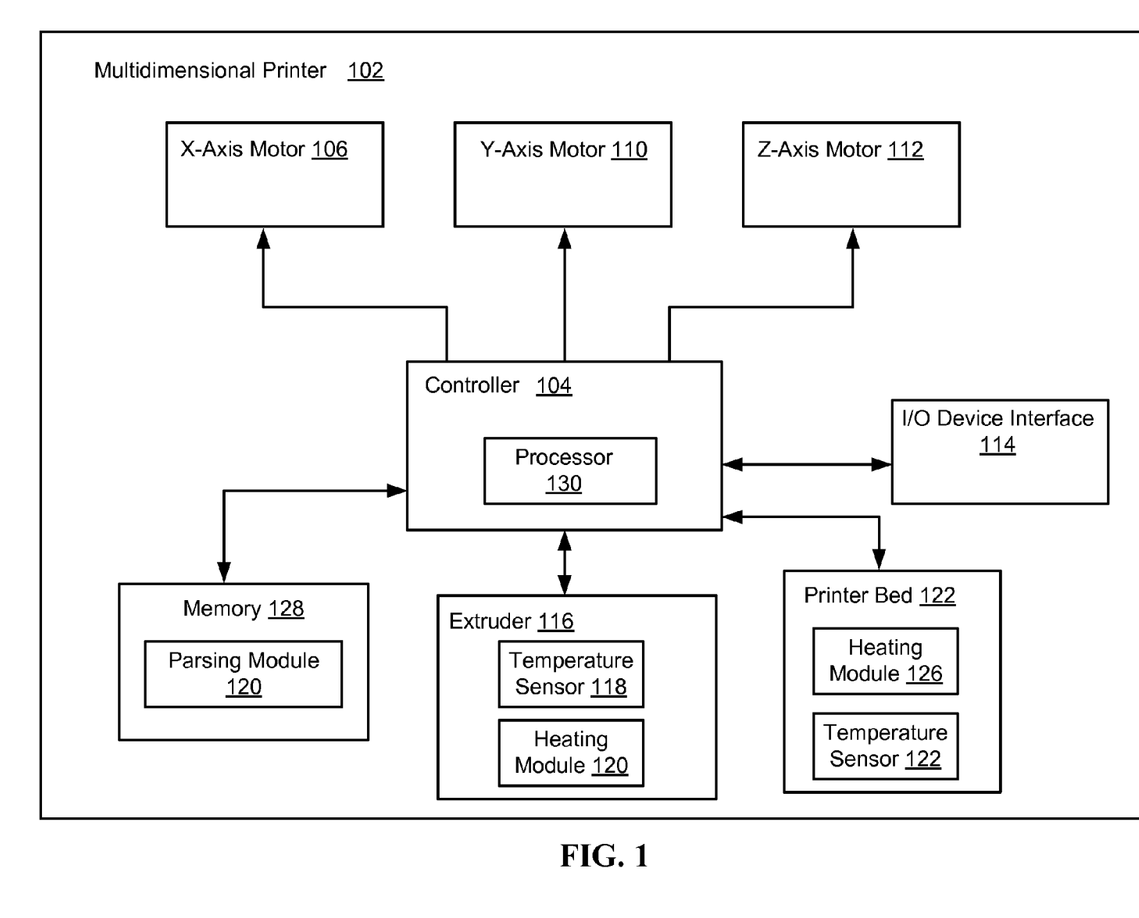
FIG. 1 is a block diagram of an example multidimensional printer, according to embodiments.

FIG. 1 is a block diagram of an example multidimensional printer 102, according to embodiments. The multidimensional printer 102 may include a controller 104 (with a processor 130) that is communicatively coupled to an X-axis motor 106, a Y-axis motor 110, a Z-axis motor 112, an I/O device interface 114, a printer bed 122, an extruder 116, and a memory unit 128. In various embodiments, the multidimensional printer 102 may be a three dimensional printer, a four dimensional printer, or any other multidimensional printer. Particularly, the multidimensional printer 102, may be any suitable printer type. For example, the multidimensional printer 102 may be a 3-D bio printer (e.g., to print human organs), a Stereolithography printer (SLA), a Fused Deposition Modeling printer (FDM), a Selective Laser Sintering printer (SLS), a Selective Laser Melting printer (SLM), Electronic Beam Melting printer (EBM), a Laminated Object Manufacturing printer (LOM), or any other suitable printer. Although FIG. 1 illustrates a particular multidimensional printer 102 configuration, it is recognized that other components may be included or subtracted, according to various embodiments.

In some embodiments, the controller 104 is configured to control the various components of the multidimensional printer 102 (e.g., the X-axis motor 106). The controller 104 may include any combination of software and/or processing components suitable for controlling the multidimensional printer 102 components. For example, the controller 104 may include a memory to house the parsing module 128, a processor (CPU) 130, and/or a microcontroller.

In embodiments, the X-axis motor 106, the Y-axis motor 110, and the Z-axis motor 112 are associated with printer heads configured to control the movement of the extruder 116 such that appropriate movements along each of the axes may be made to print the multidimensional object. In some embodiments, the X-axis motor 106, the Y-axis motor 110, and the Z-axis motor 112 are stepper motors, which perform idiosyncratic movements in increments according to the defined axis. In some embodiments, a stepper motor associated with the printer bed 122 may assist or provide the movement orientations to print a multidimensional object (e.g., the printer bed 122 may be moved in a Z-axis orientation during runtime).

The I/O device interface 114 provides an interface to any of various I/O devices or devices of other types, such as a computing device. For example, the I/O device interface 114 may be a Universal Serial Bus (USB) port configured to receive a USB cable to a computing device. In some embodiments, a user may generate or select a CAD multidimensional object schematic using a computing device, and transfer the schematic to the multidimensional printer 102 via the I/O device interface 114.

In some embodiments, the multidimensional printer includes a distinct memory unit 128 (e.g., a Secure Digital (SD) card). In some embodiments, the memory unit 128 may be included within the controller 104. In embodiments, the memory unit 128 includes a random-access semiconductor memory, storage device, or storage medium (either volatile or non-volatile) for storing or encoding data and programs. In some embodiments, the memory unit 128 represents the entire virtual memory of the multidimensional printer 102, and may also include the virtual memory of other computing systems coupled to the multidimensional printer 102 or connected via a network. The memory unit 128 may be a single monolithic entity, but in other embodiments the memory unit 128 may include a hierarchy of caches and other memory devices. For example, memory unit 128 may exist in multiple levels of caches, and these caches may be further divided by function, so that one cache holds instructions while another holds non-instruction data, which is used by a processor. The memory unit 128 may be further distributed and associated with different CPUs or sets of CPUs.

In some embodiments, the memory unit 128 includes a parsing module 120 to be executed by the processor 130. The parsing module 120 may be program instructions within the memory unit 128 configured to generate at least a first printing complexity estimate of a first portion of a multidimensional object. The parsing module 120 may further determine a printing capability of the multidimensional printer and compare the printing capability with the first complexity estimate. And based on the comparing, a first failure probability estimate may be generated for printing the first portion of the multidimensional object. In some embodiments, the parsing module 120 is within a computing device associated with the multidimensional printer 102. The operations of the parsing module 120 is further described below.

In embodiments, the extruder 116 is a chamber that receives the filament 202 and outputs the filament 202 onto a printing bed in order to print the multidimensional object. The extruder 116 may include a heating module 130 in order to melt the filament 202. The melted filament 202 may be extruded through an extrusion nozzle of the extruder to print the multidimensional object according to the virtual schematics. In some embodiments, the extruder 116 may also include a temperature sensor 118 to provide feedback to the controller 104 concerning the temperature of the extruder 116 and/or the filament 202. Accordingly, the extruder 116 may provide heat regulation such that the viscosity of the filament 202 and/or the flow rate of the filament 202 may be adjusted. In some embodiments, the extruder 116 may include a motor configured to push the filament 202 through the extruder 116 and/or extruder nozzle. In some embodiments, the extruder 116 includes a stepper motor configured to regulate interval movements of the extruder 116 or perform tasks with the X-axis motor 106, Y-axis motor 110, and/or the Z-axis motor 112 to place the extruder 116 in a particular orientation.

In some embodiments, the printer bed 122 is a substantially planar platform on which the multidimensional object is printed on. In some embodiments, the printer bed 122 includes a heating module 126 and temperature sensor 122 to provide and monitor the temperature of the printer bed 122. This may be useful for reducing the amount of warping of a multidimensional object, particularly lower layers. Warping may be caused by uneven cooling of outer and inner sections of a printed multidimensional object.

Figure 2:
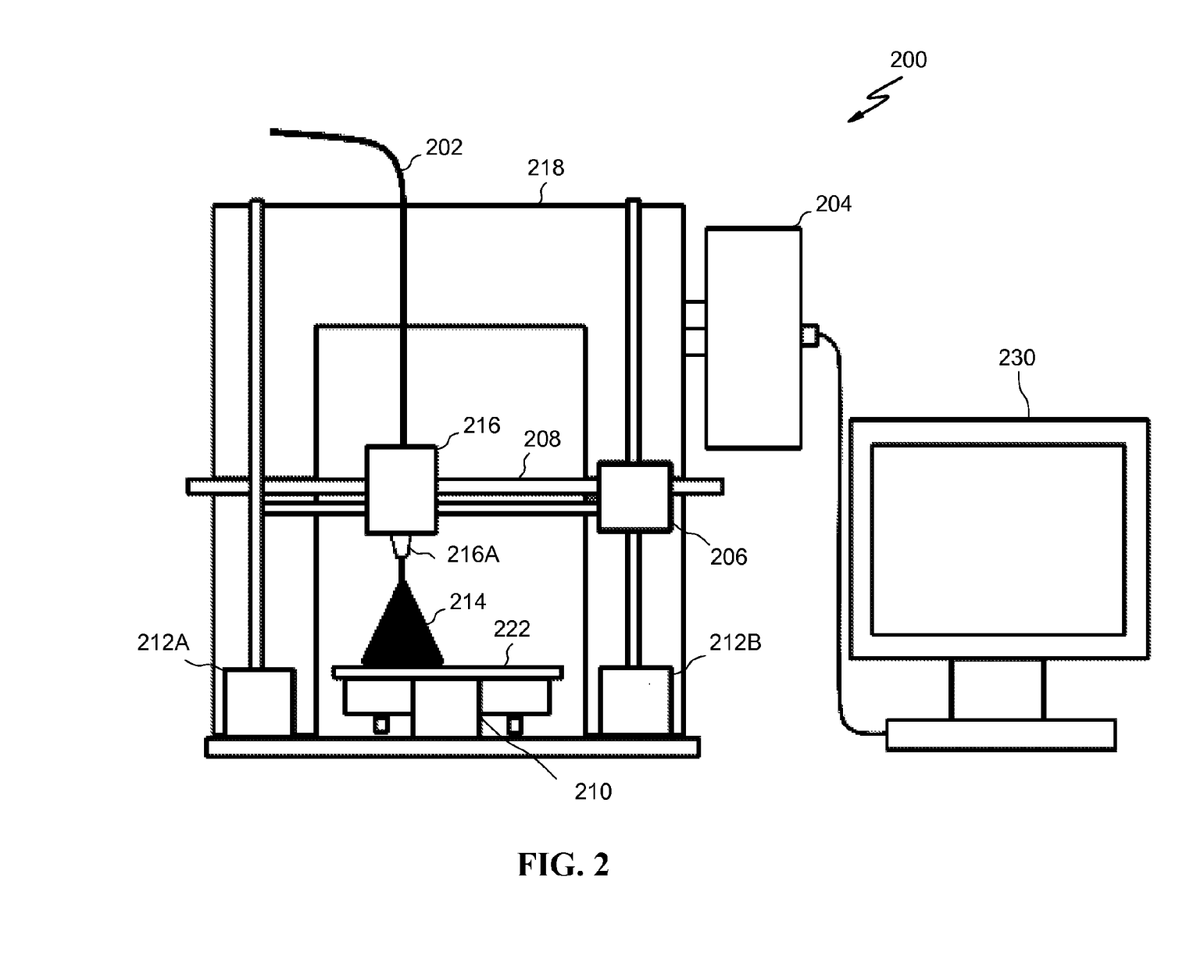
FIG. 2 is a diagram of an example multidimensional printing system that includes a computing device and a multidimensional printer, according to embodiments.

FIG. 2 is a diagram of an example multidimensional printing system 200 that includes a multidimensional printer and a computing device 230, according to embodiments. The system 200 may include a frame 218, one or more axis rods 208, an extruder 216, an extruder nozzle 216A, a printer bed 222, filament 202, and corresponding multidimensional object 214, two Z-axis motors 212A and 212B, a Y-axis motor 210, an X-axis motor 206, a controller 204, and a computing device 230.

In various embodiments, the filament 202 may be any suitable filament. For example, the filament 202 may be metal, ceramic, composite, plastic, human cells, or any other suitable filament. The type of plastic filament suitable for the system may be but is not limited to: Acrylonitrile Butadiene Styrene (ABS), Polylactic Acid (PLA), Polyvinyl Alcohol (PVA), Polycarbonate (PC), or High-Density Polyethylene (HDPE).

The frame 218 may provide structure for the multidimensional printer and include various axis rods 208. The axis rods 208 may provide support and allow the extruder 216 to move in various orientations. For example, the X-axis motor 206 may move the extruder 216 (or a stepping motor within the extruder 216 may move the extruder 216) along the axis rod 208 (along the X axis) to perform a printing run of the multidimensional object 214. In some embodiments, the system 200 need not include the axis rods 208, as the extruder 216 may move in different orientations from a free-standing position. In some embodiments, the extruder 216 is configured analogous to the extruder 116 of FIG. 1. Further, in some embodiments, the controller 204, X-axis motor 206, Z-axis motors 212A and 212B, the Y-axis motor 210, the printer bed 222 is respectively configured analogous to the controller 104, X-axis motor 106, Z-axis motor 112, Y-axis motor 110, and the printer bed 122 of FIG. 1. In some embodiments, the computing device 230 may be employed by a user who generates a virtual multidimensional object schematic on the computing device 230 and transfers the schematic to the controller 204 such that the multidimensional printer can print the multidimensional object 214. In some embodiments, the computing device 230 may include the parsing module 120 of FIG. 1 such that when the operations of the parsing module 120 are completed by the computing device 230, they are fed into multidimensional printer to process the instructions. In other embodiments, the multidimensional printer includes the parsing module 120 of FIG. 1 such that the computing device 230 may upload a virtual multidimensional object schematic to the multidimensional printer (e.g., via the I/O device interface of FIG. 1) and the multidimensional printer may perform the corresponding operations.

Figure 3:
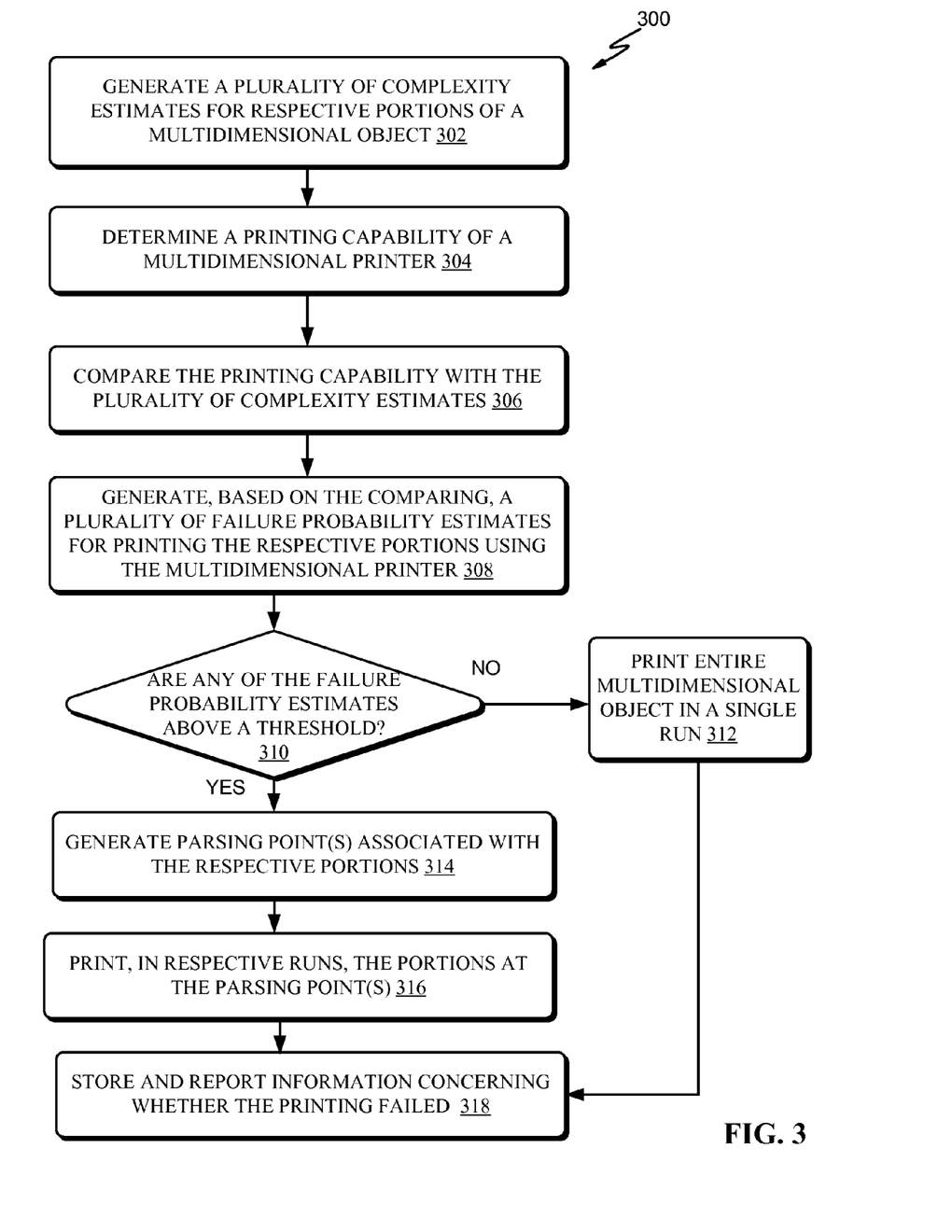
FIG. 3 is a flow diagram of an example process for printing a multidimensional object in various runs based on whether any portions of the multidimensional object are above a failure probability estimate accuracy threshold.

FIG. 3 is a flow diagram of an example process 300 for printing a multidimensional object in various runs based on whether any portions of the multidimensional object are above a failure probability estimate accuracy threshold. In some embodiments, the process 300 may start at block 302 when parsing module (e.g., parsing module 120 of FIG. 1) generates a plurality of printing complexity estimates for respective portions of a multidimensional object. For example, the parsing module may identify a texture of each portion of the multidimensional object and calculate a complexity estimate based on the texture. Block 302 is described in more detail below. The parsing module may then, according to block 304, determine a printing capability of the multidimensional printer. For example, the parsing module may determine a make and model, the individual components, and the filament capability of the multidimensional printer. Block 304 is described in more detail below.

In some embodiments, the parsing module may then, per block 306, compare the printing capability with the plurality of printing complexity estimates. In some embodiments, the printing capability (block 304) may be a numerical estimate based on confidence levels and other information as described herein. Further, the printing complexity estimates (block 302) may also be a numerical estimate based on confidence levels. In an illustrative example, comparing of the estimates per block 306 may be simply adding each estimate together, such as a printing complexity estimate of 40 (regarding a first portion) and a printing capability of 20.

In some embodiments, the parsing module may then perform block 308 to generate, based on the comparing, a plurality of failure probability estimates for printing the respective portions using the multidimensional printer. The failure probability estimate may be for use in determining a likelihood that the multidimensional printer will print the first portion with an accuracy that exceeds an accuracy threshold. In some embodiments, a particular failure probability estimate of a portion may be calculated by adding the respective printing complexity estimate for the portion and a printing capability (estimate) of a multidimensional printer. For example, using the illustration above, if for a first portion of a multidimensional object, the printing complexity estimate was 40 and a printing capability was 20, then the failure probability estimate may be 60 (40+20=60). In some embodiments, the failure probability estimate may be a percentage probability of failure (e.g., a confidence level probability of failure) or converted to a percentage probability of failure. For example, using the illustration above, the failure probability estimate of 60 may correspond to a 60% chance that the multidimensional printer will not be able to successfully print the first portion of the multidimensional object. In some embodiments, the failure probability estimate may include or solely be a success probability estimate. Accordingly, instead of or in addition to providing a failure probability estimate, a parsing module may provide a success probability estimate.

In block 310 the parsing module may then determine whether any of the failure probability estimates exceeds an accuracy threshold. The accuracy threshold may be any suitable value for embodiments of the present disclosure. For example, using the illustration above, if the failure probability estimate is a 60% chance of failure, the accuracy threshold may be any failure probability estimates above a 50% chance of failure. Accordingly, 60% would exceed the accuracy threshold of 50%, which means that block 314 would be performed in some embodiments. In block 312, if no failure probability estimates are above the accuracy threshold, then the multidimensional printer may print the entire multidimensional object in a single run. Accordingly, because there is not a high chance that the multidimensional printer will fail in printing any portion of the multidimensional object, the entire multidimensional object may be printed at one time.

If any of the failure probability estimates are above the accuracy threshold then, per block 314, the parsing module may generate parsing points associated with the respective portions that exceed the failure probability estimate accuracy threshold. A parsing point may be a logical point or marker that defines a printing boundary between two or more portions of a multidimensional object. The parsing point may be placed on a virtual multidimensional object schematic. The parsing point may be utilized by the multidimensional printer as a beginning and/or a stopping point to print a corresponding multidimensional object. In an illustrative example, a user may first upload a virtual multidimensional object schematic onto a computing device. Before the schematic gets uploaded to the multidimensional printer, the parsing module within the computing device may first generate the plurality of failure probability estimates and generate corresponding parsing points on the schematic. For example, 2 portions of the multidimensional object schematic may be deemed to be above the failure probability estimate accuracy threshold. Accordingly, at least one parsing point may be placed on the schematic to define the two portions, as discussed in more detail below.

In some embodiments, the parsing points may not be based solely on which portions are above the failure probability estimate thresholds, but include other dynamic factors. For example, the parsing points may be based on general portions of the multidimensional object schematic that show a relatively high failure probability rate. In an illustrative example, a multidimensional object may comprise a first portion, a second portion, and a third portion. The first portion may be deemed to have a 50% failure probability estimate, the second portion may have a 45% failure probability estimate, and the third portion may have only a 10% failure probability estimate. The first portion may be the only portion above an accuracy threshold. Accordingly, the parsing point may not necessarily be placed at a boundary of the first portion to define the first portion, but may be placed at a boundary of the second portion, as described in more detail below. In other dynamic factor examples, the parsing point may be further based on a user's ability to attach different portions of the multidimensional object together. In an illustration, there may be an option to place a parsing point at a boundary of a complex portion of a multidimensional object (e.g., a portion with multiple rivets) or a portion with a smooth surface. However, it may be more difficult to place fasteners at the boundary of the complex portion when compared with a boundary of the portion having the smooth surface. Accordingly, the parsing point may be placed at the boundary of the portion having a smooth surface portion such that attaching the portions of the multidimensional object may be easier. In some embodiments, the parsing point placement may be based on the bonding capability between two filaments, as described above.

In some embodiments, in response to the generation of the parsing points per block 314, the multidimensional printer may, per block 316, print in respective runs, the portions beginning or ending at the parsing points. For example, if a parsing module parsed a virtual multidimensional object schematic down the middle of the multidimensional object (e.g., 50% of the multidimensional object schematic is on one side of the parsing point, and 50% of the multidimensional object schematic is on the other side of the parsing point), then the multidimensional printer may split the printing run into two portions at the parsing point. For example, the first 50% of the multidimensional object may be printed in a first run, and the second 50% may be printed in a second run. As discussed above, printing in various runs according to failure probability estimates may save an entire printing job from being wasted. For example, if a first portion of a multidimensional object was printed successfully, but a second portion was printed unsuccessfully, printing of the second portion only may be repeated as opposed to printing the entire multidimensional object again notwithstanding the printing success of the first portion.

In some embodiments, after at least two portions of a multidimensional object are printed in two or more runs, the two portions may be attached in various manners to form a single multidimensional object. For example, the two portions may include internal fasteners to attach the two portions.

In some embodiments, in response to the printing per block 316 or block 312, the multidimensional printer and/or associated computing device may store and report information concerning whether the printing failed per block 318. For example, if the printing is above a satisfaction threshold (which is discussed in more detail below) that is defined by a user or a program module, then a notification may be displayed to a user's computing device that indicates the printing was successful. Moreover, the information may be stored to the computing device and/or multidimensional printer such that a printing capability (e.g., block 314) history may be stored for a future printing run between the same multidimensional printer and the same multidimensional object.

Figure 4:
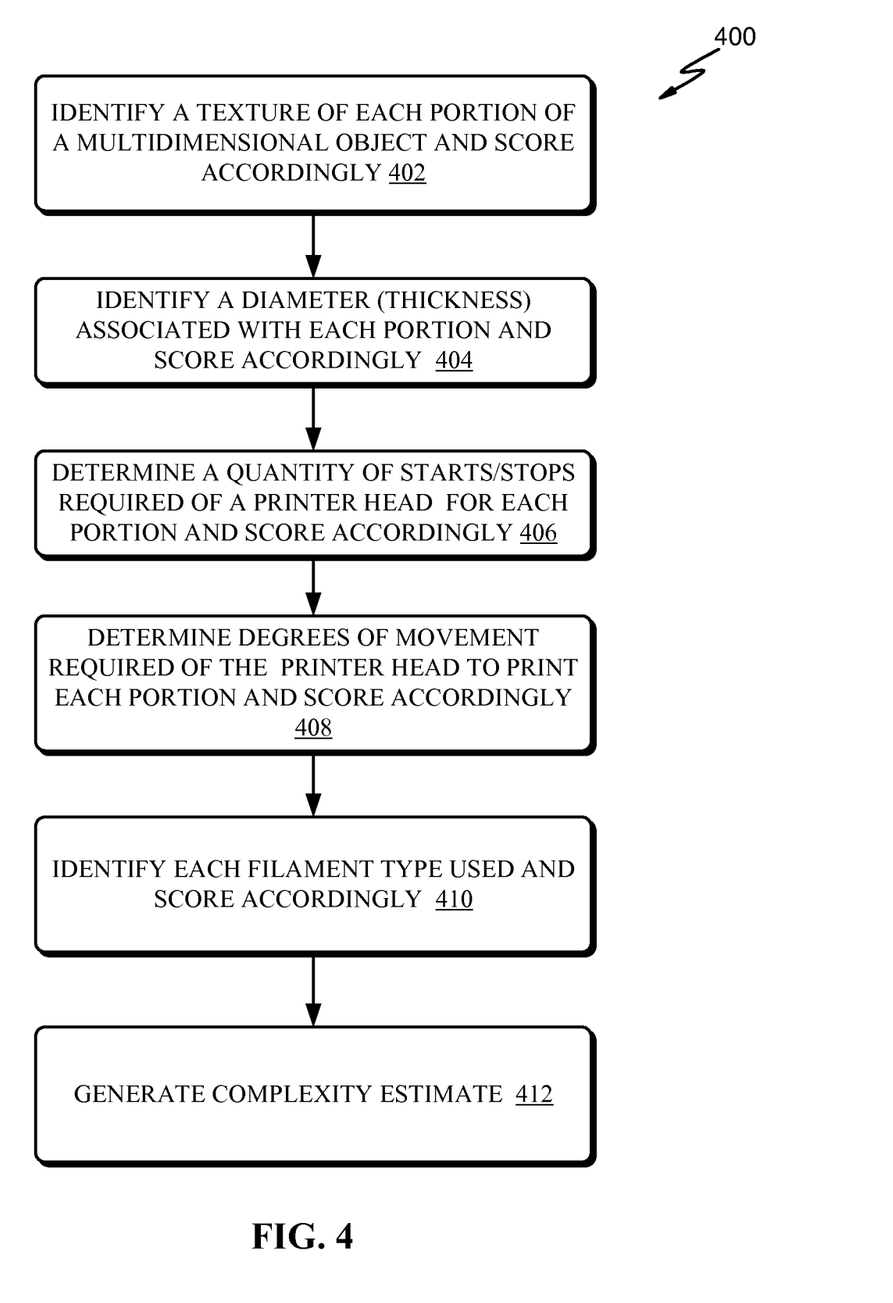
FIG. 4 is a flow diagram of an example process for generating a complexity estimate for portions of a multidimensional object, according to embodiments.

FIG. 4 is a flow diagram of an example process 400 for generating a complexity estimate for portions of a multidimensional object, according to embodiments. In some embodiments, the process 400 may be part of block 302 as specified in FIG. 3. Process 400 may begin when a parsing module (e.g., the parsing module 120 of FIG. 1) performs block 402 to identify a texture of each portion of a multidimensional object schematic and score the texture based on the identifying. For example, if a first portion of a multidimensional object comprised various deep grooves, rivets, and/or protruding shapes, the parsing module may analyze the object and may determine that the first portion is complex and a corresponding score may be given to indicate that the texture is complex (e.g., a score of 10). Alternatively, a second portion of a multidimensional object may comprise a flat surface. Accordingly, the parsing module may determine that the second portion is not complex and a corresponding score may be given to indicate that the texture is not complex (e.g., a score of 1). In these embodiments, texture complexity scores may be based on distance or ratio thresholds between various features of a portion. For example, a feature of a portion may extend at a distance of 3 inches and vary considerably in shape, which may be above a threshold. In some embodiments, the multidimensional printer may include models of various texture layouts and associated scores and match a current multidimensional object schematic with the models and score accordingly.

In some embodiments, the parsing module may, per block 404, identify a diameter or thickness associated with each portion of the multidimensional object and provide a score accordingly. For example, if a portion required that an outside wall be $\frac{1}{1000}$ of an inch, (e.g., the thickness of a sheet of paper), the parsing module may analyze the portion of the schematic and determine that the portion is complex and provide a corresponding score. Thickness complexity scores may be based diameter thresholds (e.g., any diameter less than $\frac{1}{100}$ of an inch or greater than 5 inches may be above a threshold and cause a particular score) or other thresholds.

Per block 406, a parsing module may determine a quantity of starts or stops for each portion of the multidimensional object and score accordingly. For example, a multidimensional object may require printing various narrow and elongated protrusions. Accordingly, the multidimensional printer may repeatedly start and stop printing to complete the printing of the narrow and elongated protrusions. Complexity scores according to block 406 may be based on start and/or stop threshold quantities.

The parsing module may also, per block 408, determine the degrees of movement required of a printer head to print each portion and score accordingly. In some embodiments, block 408 corresponds with block 402 to identifying a texture estimate. Accordingly, the parsing module may determine a ratio or distance threshold between two features of a portion and therefore calculate the degree of movements needed for the printer head to print each feature. In some embodiments, movement score may not only be based on texture scores, but movement needed to print features on an inner portion of the multidimensional object. In some embodiments, the scores may be based on degree of movement thresholds.

In some embodiments, the parsing module may, per block 410, identify each filament type to be used during the multidimensional printing and score accordingly. Some filaments may be more difficult to print based on flexibility, viscosity, cooling rate, etc. In some embodiments, the identifying is based on a user input that specifies what types of filaments are being used and the filament input may be matched against a filament score. In some embodiments, the parsing module or other component may identify filaments based on the melting point of each filament, or the point at which filament was dispensed out of the extruder. For example, the extruder may include a temperature sensor, a heater, and a motion sensor to detect when the filament first extrudes. This may allow the multidimensional printer or associated computing device to determine at what temperature are particular filaments extruded out of the nozzle, which may be different depending on the filaments utilized. In some embodiments, the filament type score may be based on whether two or more filaments may be easily fused together if the multidimensional object requires using two or more filament types. The multidimensional printer or associated computing device may include models of filaments pairs with associated scores that specify if the filament pairs may be easily fused or not easily fused together. In some embodiments, whether filament pairs are easily or not easily fused may be based on bonding capabilities between the two filaments. In these embodiments, a user may identify the two filaments, and the parsing module may score the pair based on known or a historical bonding capability between the filaments. In some embodiments, if a filament pairs is scored as not being able to be easily fused together, the point at which the filaments fused may be utilized as a potential parsing point, as specified above.

In some embodiments, the parsing module may perform block 412 by statically adding each of the scores that correspond to each of the blocks (402, 404, 406, 408, and 410) to arrive at a final complexity estimate for each feature of the multidimensional object. In some embodiments, the complexity estimate may be dynamic in that some of the scores (e.g., block 410 filament type scores) may be weighted higher (e.g., carry a greater significance) toward the overall complexity estimate or solely be responsible for the overall complexity estimate. In some embodiments, more scores may be utilized for the process 400 than illustrated or some scores specified in process 400 may not be included in the block 412 complexity estimation.

Figure 5:
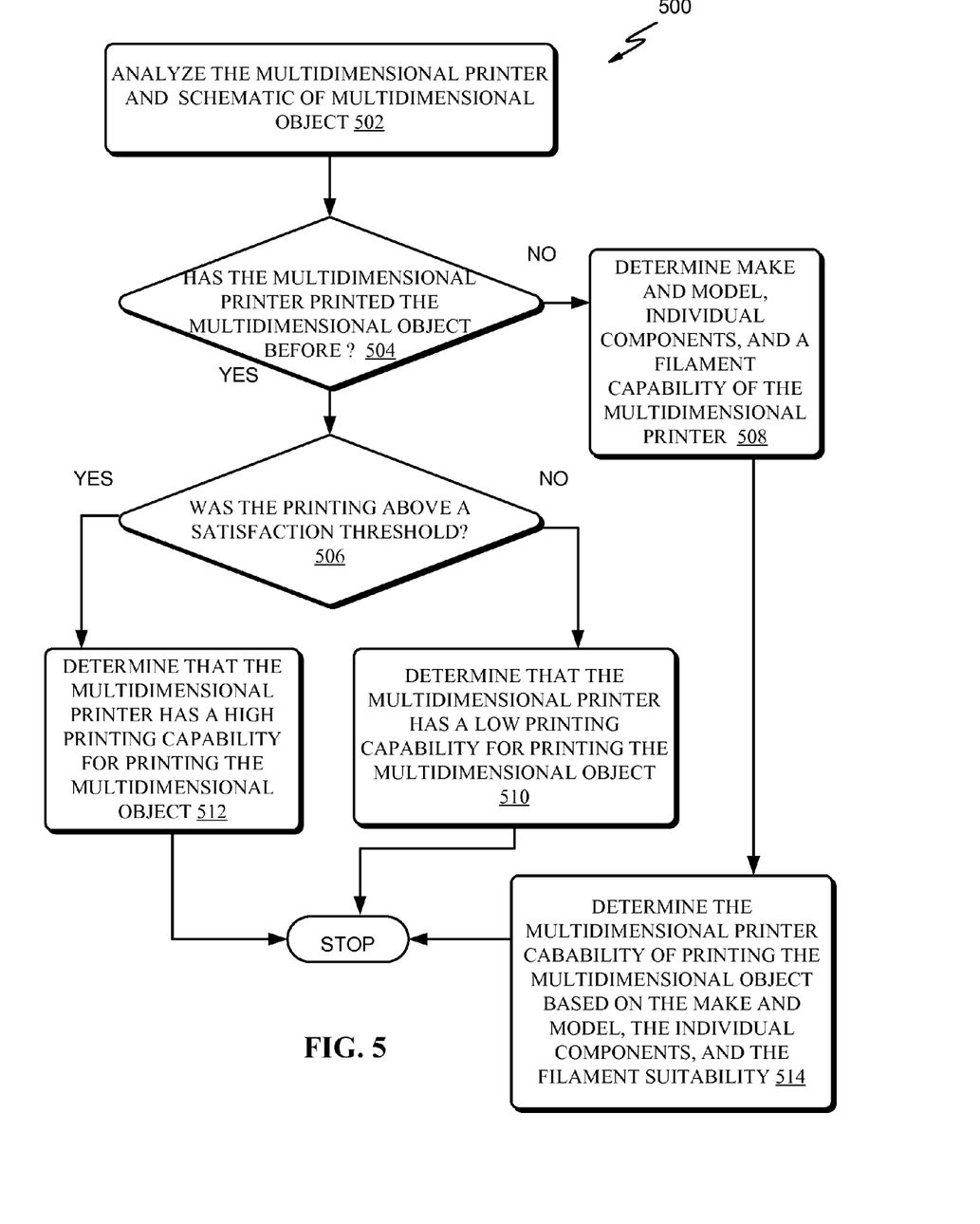
FIG. 5 is a flow diagram of an example process for determining a printing capability of a multidimensional printer, according to embodiments.

FIG. 5 is a flow diagram of an example process 500 for determining a printing capability of a multidimensional printer, according to embodiments. In some embodiments, the process 500 may be a part of block 304 of FIG. 3. In embodiments, the process 500 may begin at block 502 when a parsing module (e.g., the parsing module 120 of FIG. 1) or other module analyzes a multidimensional printer and an associated schematic of a multidimensional object that will be printed by the multidimensional printer.

In some embodiments, the multidimensional printer and/or associated computing device may store a history concerning whether a particular multidimensional printer has printed a particular multidimensional object at a first time prior to a second time. The history may be useful to determine a printing capability of the multidimensional printer with respect to the multidimensional object. Moreover, the history may be useful for generating a failure probability estimate for printing the multidimensional object, as specified in block 308 of FIG. 3.

In some embodiments, per block 504, if the multidimensional printer has not printed the multidimensional object before (i.e., there is no history), then, per block 508, a parsing module or other component may determine a make and model of the multidimensional printer. Further, the parsing module or other component may determine individual components of the multidimensional printer (e.g., type of extruder, axis components, etc.). Moreover, a filament suitability may be determined. Accordingly, it may be determined how many different types of filaments may be able to be printed by the multidimensional printer. In some embodiments, the determinations of block 504 may be based on a user input. In some embodiments, the multidimensional printer may store an identification number associated with each of the determined features such that the determination can be quickly made. For example, the make and model identification number may be stored within the multidimensional printer.

In some embodiments, per block 514, a parsing module or other component may determine the multidimensional printer capability for printing the particular multidimensional object based on the determinations made in block 508. The printing capability per block 514 may be based on comparing various features of the multidimensional printer with the multidimensional object schematic (e.g., compare multidimensional printer's model and its capabilities with what is required to print a feature of the schematic). In some embodiments, each multidimensional printer determination (e.g., make, filament suitability, etc.) may include a score that is added together to form a printing capability estimate as specified in block 514.

In some embodiments, if the multidimensional printer has printed the multidimensional object before (there is a history), then per block 506, a determination of whether the multidimensional printer printed the multidimensional object above a satisfaction threshold may be made. A satisfaction threshold may be a threshold value defined by a user, computing device, and/or multidimensional printer that defines a point at which the printing between a particular multidimensional printer and a particular multidimensional object was successful. In some embodiments, the satisfaction threshold may be a compilation of accuracy thresholds for different portions needed when comparing a printing capability and a complexity estimate of a portion. The specifying and recording of whether the printing was successful may be useful for providing a printing history between the particular multidimensional printer and the multidimensional object for future printing runs. In some embodiments, the satisfaction threshold may be determined by a user, and the user may specify (e.g., via block 414 of FIG. 3) to the multidimensional printer and/or associated computing device whether the printing was successful. Alternatively, in some embodiments, the parsing module or other component may determine whether the printing was above a satisfaction threshold. In these embodiments, the printing satisfaction threshold may be determined by first scanning a virtual multidimensional object schematic and scanning the actual multidimensional object. The actual multidimensional object may then be compared to the schematic. Accordingly, any deviations within the actual multidimensional object when compared to the schematic may be recorded to eventually provide a score for determining whether the printing was above a satisfaction threshold. In some embodiments, the multidimensional printer may have printed above a satisfaction threshold at one time, but may have been below the satisfaction threshold at other times. In these embodiments, a parsing module or other component may determine the satisfaction threshold by determining whether the printing was successful over a certain threshold percentage of time.

In some embodiments, if the printing was above a satisfaction threshold, then per block 512, a parsing module or other component may determine that the multidimensional printer has a high capability for printing the multidimensional object. In some embodiments, if a high printing capability is determined then the failure probability estimate for printing the multidimensional object may not exceed the accuracy threshold (e.g., it is likely that the multidimensional printer will print the multidimensional object with great accuracy). Accordingly, the multidimensional printer may print an entire multidimensional object in a single run (e.g., block 312 of FIG. 1).

In some embodiments, if the printing was not above a satisfaction threshold, then per block 510, a parsing module or other component may determine that the multidimensional printer has a low printing capability for printing the current particular multidimensional object. In some embodiments, if a low printing capability is determined, then the failure probability estimate for printing the multidimensional object may exceed an accuracy threshold. Accordingly, the multidimensional printer may generate parsing points associated with the respective portions of a multidimensional object that were below the satisfaction threshold. Consequently, the multidimensional printer may print in respective runs the portions that are defined by the parsing points.

Figure 6:
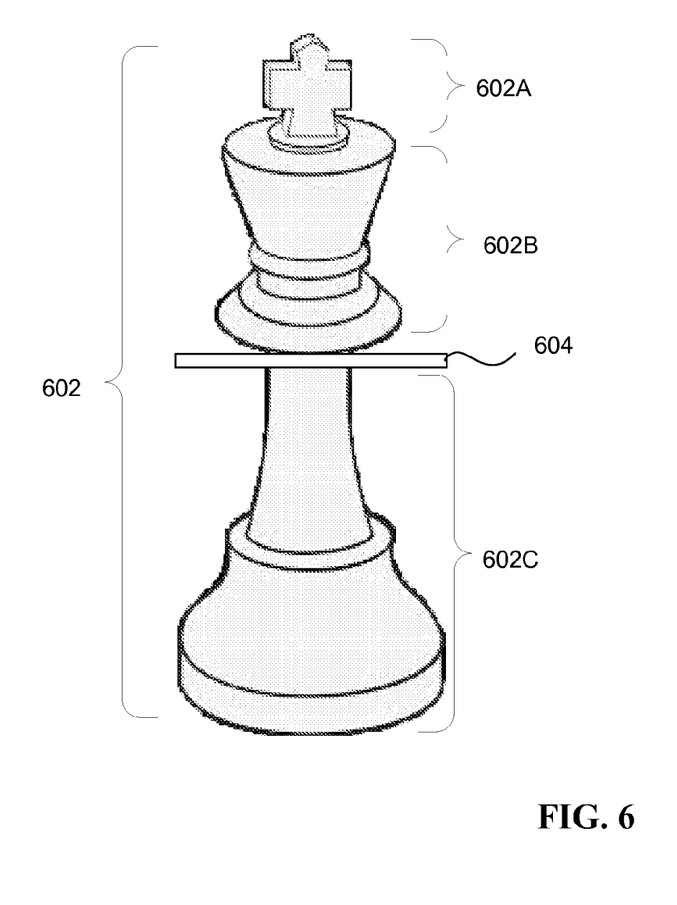
FIG. 6 is a diagram of an example multidimensional object schematic, portions of the schematic, and one example of a parsing point.

FIG. 6 is a diagram of an example multidimensional object schematic, portions of the schematic, and one example of a parsing point. The multidimensional object schematic 602 may include portion 602A, portion 602B, portion 602C, and a parsing point 604. The multidimensional object schematic 602 may correspond with how the actual multidimensional object will be assessed and printed after receiving the multidimensional object schematic 602. In an example illustration, the portion 602A may have a failure probability estimate of 80% (e.g., the multidimensional printer is 80% likely to print the multidimensional object with poor accuracy), portion 602B may have a failure probability estimate of 60%, and portion 602C may have a failure probability estimate of 10%. The failure probability estimate accuracy threshold may be any failure probability estimate over 50%, which is considered a point at which at least one parsing point may potentially be created to print in different runs. Using the illustration above, in some embodiments, an additional parsing point may be placed under portion 602A (but above 602B) in order for the printer to print only portion 602A in a single run, as both 602A and 602B exceed the failure probability estimate accuracy threshold. In other embodiments, as illustrated in FIG. 6, only one parsing point 604 may be placed under portion 602B (but above portion 602C). Accordingly, because portions 602A and 602B are both above the failure probability accuracy threshold, the multidimensional printer may print both portions 602A and 602B in a single run that begins or ends at the parsing point 604. Likewise, the multidimensional printer may print portion 602C in a second run. In some embodiments, portion 602B may be under the failure probability accuracy threshold, for example 45%. In this example, the parsing point 604 may still be placed under portion 602B because portions 602A and 602B together may still exhibit a relatively high failure probability estimate. Further, generating a single parsing point 604 instead of multiple parsing points (e.g., generating a parsing point under portion 602A), may save time and resources needed to attach the portions together after they have been printed in various printing runs.

Figure 7:
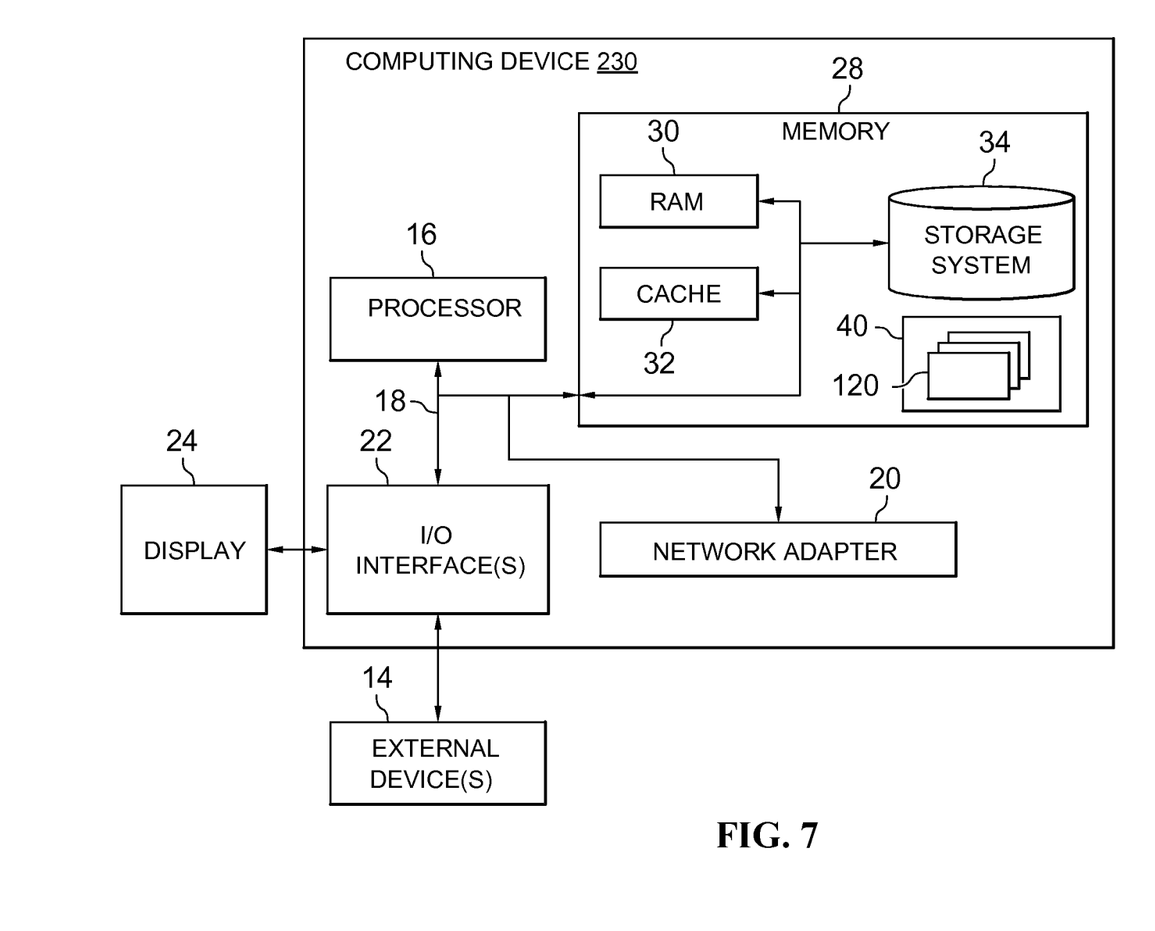
FIG. 7 is a block diagram of the computing device of FIG. 2, according to embodiments.

FIG. 7 is a block diagram of the computing device 230 of FIG. 2, according to embodiments. The computing device 230 may be but is not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, mobile phones, smart watches, touch pads, and the like.

The computing device 230 may be described in the general context of computer system-executable instructions, such as program modules, being executed by a computing device (e.g., parsing module 120 of FIG. 1). Generally, program modules may include routines, programs, objects, components, logic, data structures, and so on that perform particular tasks or implement particular abstract data types. Computing device 230 may be practiced in distributed cloud computing environments where tasks are performed by remote processing devices that are linked through a communications network. In a distributed cloud computing environment, program modules may be located in both local and remote computer system storage media including memory storage devices.

The components of computing device 230 may include, but are not limited to, one or more processors 16 or processing units, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing device 230 typically includes a variety of computer system readable media. Such media may be any available media that is accessible by the computing device 230, and it includes both volatile and non-volatile media, removable and non-removable media.

System memory 28 can include computer system readable media in the form of volatile memory, such as random access memory (RAM) 30 and/or cache memory 32. Computing device 230 may further include other removable/non-removable, volatile/non-volatile computing device storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of parsing modules 120, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Parsing modules 120 generally carry out the functions and/or methodologies of embodiments of the invention as described herein. The parsing module 120 may perform identical functions as described by the parsing module 120 of FIG. 1.

Computing device 230 may also communicate with one or more external devices 14 such as a multidimensional printer (e.g., the multidimensional printer 102 of FIG. 1), a keyboard, a pointing device, a display 24, etc.; one or more devices that enable a user to interact with the computing device 230; and/or any devices (e.g., network card, modem, etc.) that enable the computing device 230 to communicate with one or more other computing devices. Such communication can occur via Input/Output (I/O) interfaces 22. Still yet, computing device 230 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Aspects of the present invention may be a system, a method, and/or a computer program product. The computer program product may include a computer readable storage medium (or media) having computer readable program code or instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating, by a processor within a multidimensional printer, a first complexity estimate of a first portion of a multidimensional object, the generating of the first complexity estimate includes generating a first real number value of one or more physical structures that are within the first portion of the multidimensional object, the real number value is a score indicating how complex the one or more physical structures are;
determining a printing capability of the multidimensional printer, multidimensional printer for use in printing the multidimensional object;
comparing the printing capability with the first complexity estimate; and
generating, by the processor and based on the comparing, a first failure probability estimate, the failure probability estimate for use in determining a likelihood that the multidimensional printer will print the first portion with an accuracy that exceeds an accuracy threshold.

2. The method of claim 1, further comprising:
generating a second complexity estimate of a second portion of the multidimensional object;
comparing the printing capability with the second complexity estimate; and
generating, based on the comparing the printing capability with the second complexity estimate, a second failure probability estimate.

3. The method of claim 2, further comprising:
determining that the second failure probability estimate exceeds the accuracy threshold;
generating, based on at least the determining that the second failure probability estimate exceeds the accuracy threshold, at least one parsing point, the parsing point defining a printing boundary between the first and second portions of the multidimensional object; and
in response to the generating at least one parsing point, printing in a first run, by the multidimensional printer, the second portion of the multidimensional object, wherein the printing begins or stops at the parsing point.

4. The method of claim 3, further comprising, printing in a second run, by the multidimensional printer, the first portion of the multidimensional object, wherein the printing begins or stops at the parsing point.

5. The method of claim 3, wherein the generating the parsing point is based on at least determining a capability of attaching the first portion to the second portion.

6. The method of claim 1, wherein the generating of the first complexity estimate is based on a texture of the first portion, a thickness of the first portion, and a quantity of start and stop movements required of a printer head of the multidimensional printer to print the first portion.

7. The method of claim 1, wherein the generating of the first complexity estimate is based on degrees of movement required of a printer head to print the first portion, and a filament type, the filament being a medium utilized to print the multidimensional object.

8. The method of claim 1, wherein the printing capability is based on the following: a make and model of the multidimensional printer or individual components of the multidimensional printer, a history of whether the multidimensional printer has exceeded a satisfaction threshold in printing the multidimensional object, and a filament suitability, wherein the filament suitability corresponds to whether the multidimensional printer is capable of printing the multidimensional object using a particular filament.

9. A computer program product comprising a computer readable storage medium having program instructions embodied therewith, the program instructions executable by a processor to:
generate, one or more complexity estimates for a first portion and a second portion of a multidimensional object based on a physical structure of the first portion and the second portion, the generating of the one or more complexity estimates includes numerically scoring one or more features of the first portion and the second portion to indicate how complex the first portion and the second portion are;
determine a printing capability of a multidimensional printer, the multidimensional printer for use in printing the multidimensional object;
compare the printing capability with the one or more complexity estimates to determine whether the multidimensional printer can print the multidimensional object given the one or more complexity estimates;
generate, based on the comparing, one or more failure probability estimates, the one or more failure probability estimates includes determining a likelihood that the multidimensional printer will print the first portion and the second portion with an accuracy that exceeds an accuracy threshold; and
cause the multidimensional printer to print the first portion in a first run and print the second portion in a second run based at least on the whether the multidimensional printer will print the first portion and the second portion with the accuracy that exceeds the accuracy threshold.

* * * * *